UNITED STATES PATENT OFFICE.

EDWARD DUEMPELMAN AND JULIUS EDMUND DOTCH, OF WASHINGTON, DISTRICT OF COLUMBIA.

IMPROVED COMPOSITION FOR PAVEMENTS, ROOFING, &c.

Specification forming part of Letters Patent No. 87,031, dated February 16, 1869.

*To all whom it may concern:*

Be it known that we, EDWARD DUEMPELMAN and JULIUS EDMUND DOTCH, of the city of Washington, District of Columbia, have invented a new and Improved Roofing-Cement, and for the use of pavements, and for all purposes where cement is used; and we do hereby declare that the following is a full and exact description thereof.

The nature of the invention consists in mixing one barrel of coal-tar with one barrel of pine-pitch, to melt them till all the water contained in them is evaporated; then to mix with them ten to twenty pounds of sulphur till the whole mixture is entirely vulcanized; and then to add two gallons of boiled linseed-oil, two pounds of litharge, and one or two barrels of powdered slate.

To enable others skilled in the art to make and use our invention, we will proceed to describe its operation.

We first make the tar perfectly free from water by evaporation, and we then vulcanize it with the sulphur. When the thorough vulcanization is effected we put in the pitch and the boiled linseed-oil, and mix the whole with the litharge and powdered slate.

What we claim as our invention, and desire to secure by Letters Patent, is—

The application of the above mixtures in the above-named proportions, and prepared in the manner described.

EDWARD DUEMPELMAN.
JULIUS EDMUND DOTCH.

Witnesses:
  J. D. PATTEN,
  J. P. KLINGLE.